Oct. 11, 1966  V. B. HAAS, JR  3,278,825
STATIC INVERTER UTILIZING A MODIFIED SCOTT-T TRANSFORMER
Filed Nov. 1, 1962  2 Sheets-Sheet 2
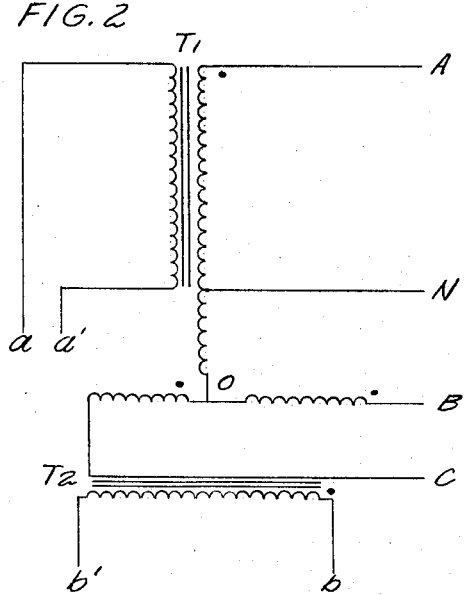
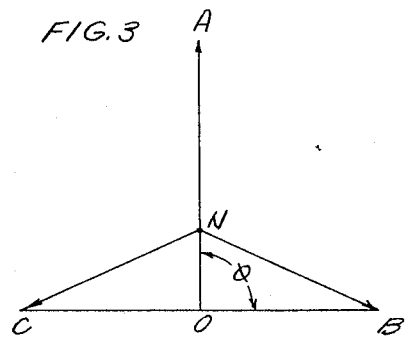
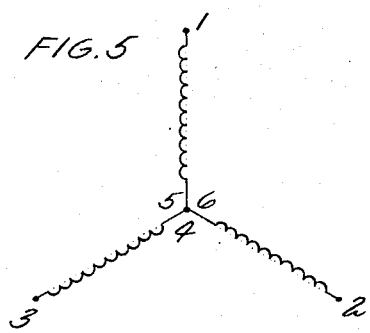
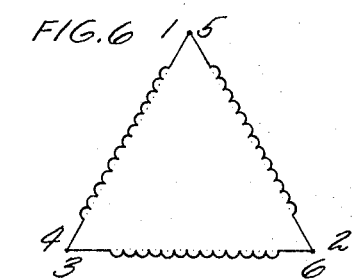
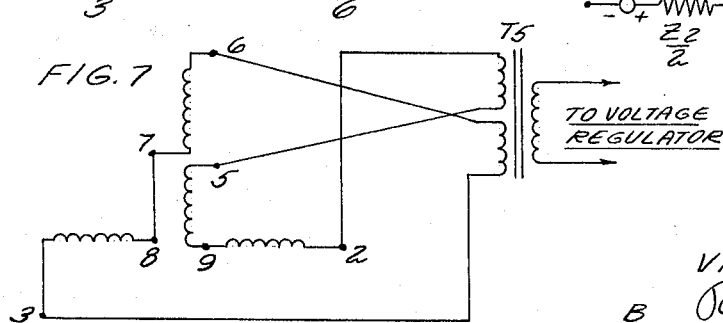
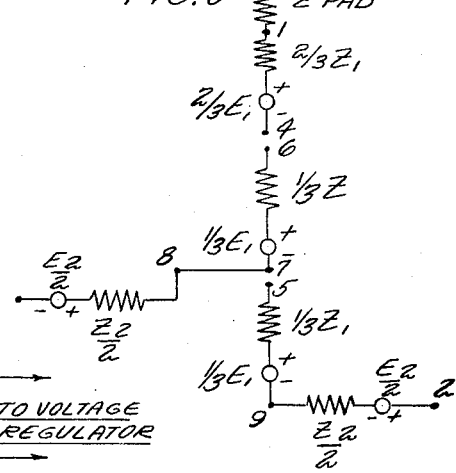
INVENTOR
VINTON B. HAAS JR.
BY Roy A Van Uihe
ATTORNEY

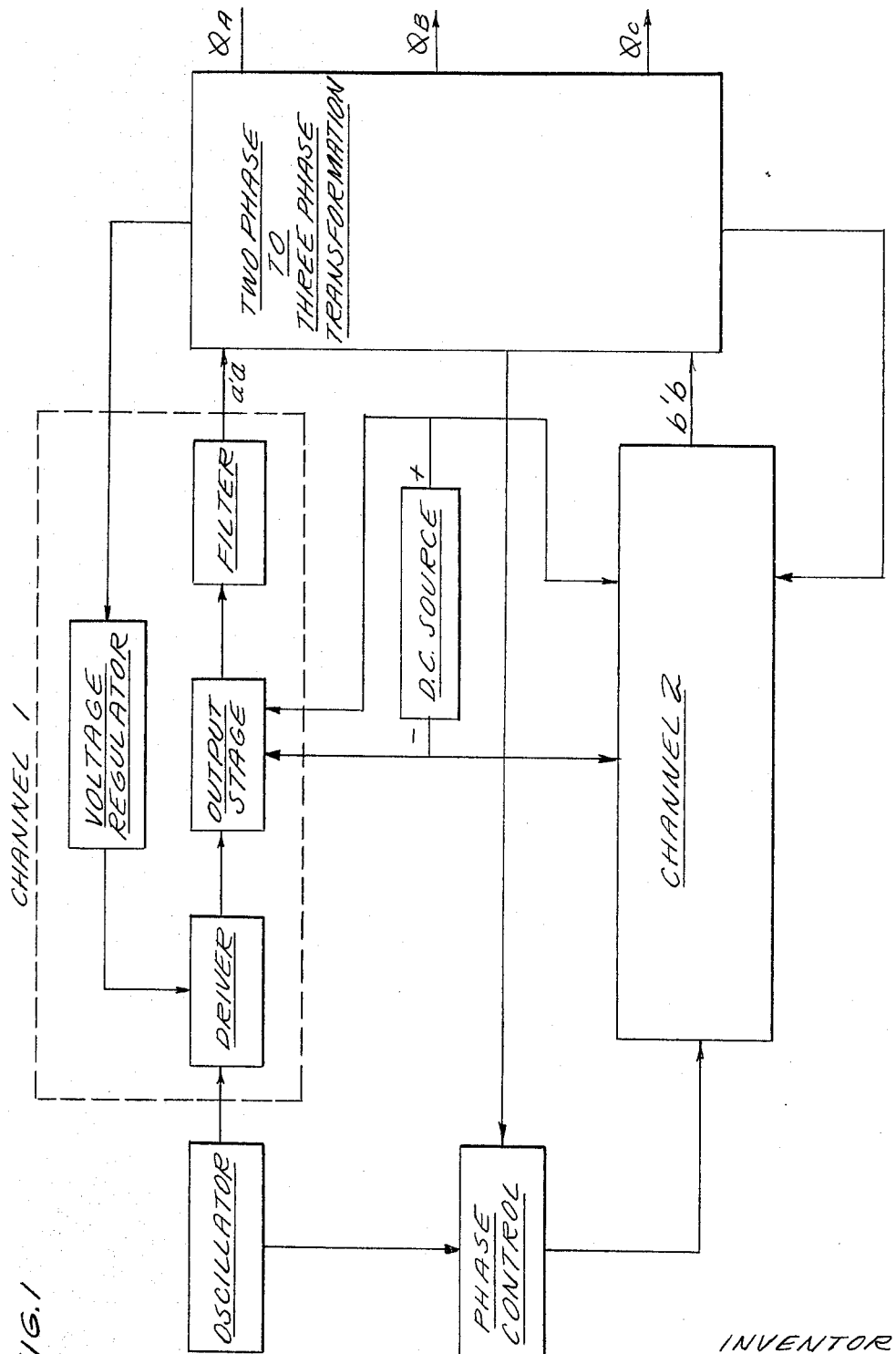

United States Patent Office

3,278,825
Patented Oct. 11, 1966

3,278,825
STATIC INVERTER UTILIZING A MODIFIED SCOTT-T TRANSFORMER
Vinton B. Haas, Jr., Storrs, Conn., assignor to United Aircraft Corporation, East Hartford, Conn., a corporation of Delaware
Filed Nov. 1, 1962, Ser. No. 234,696
3 Claims. (Cl. 321—5)

My invention relates to apparatus for converting a two-phase alternating voltage to a three-phase voltage. More particularly, my invention is directed to a novel control scheme for a static inverter which utilizes a Scott-T transformer configuration.

While not limited thereto, my invention has particular utility when used to convert the two-phase output voltage from a two-channel static inverter to a three-phase voltage. As is well known, a static inverter is a device which produces alternating current from direct current without an operational dependence on relative mechanical motion between component parts. In their usual environment, such as the power supply for a manned satellite, the size and weight of the inverter is a prime consideration. In order to minimize size and weight while still providing the highly desirable three-phase circuit with its characteristic of constant power being delivered to the load, the art has developed a technique of using two inverter channels with a controlled phase relationship. These two channels feed a two-phase to three-phase conversion device. The foregoing approach has the advantage that, by using two inverter channels rather than three channels with a controlled phase relationship, one inverter channel is eliminated thus permitting a substantial saving in size and weight. However, the usual method of converting the two-phase output to three-phase; the use of a pair of output transformers with their secondary windings connected in Scott-T configuration; presents a problem previously unsolved. This problem arises from the fact that the Scott-T configurations of the prior art provided only four secondary leads from a fixed Y connected source. For many applications it is desirable to have available six leads from three independent secondary windings providing the flexibility of choosing either a Y or Δ connected source.

My invention overcomes the above discussed limitation of the prior art by providing a static inverter utilizing Scott-T transformer configuration with six leads from three independent secondary windings that may be connected in either Y or Δ.

It is therefore an object of my invention to convert a two-phase voltage into a three-phase voltage.

It is another object of my invention to provide a novel static inverter.

It is yet another object of my invention to provide a static inverter which utilizes a Scott-T transformer configuration with six leads from three independent secondary windings that may be connected in either Y or Δ as desired.

It is also an object of my invention to simply, inexpensively, and with minimum weight increase accomplish the other objects of my invention.

These and other objects of my invention are accomplished by providing an additional winding on the secondary of the teaser transformer of a Scott-T configuration and by making available all four terminals of the other two windings on this transformer. There is thus provided, by proper connection with the two secondary windings of the main transformer, a Scott-T configuration with six available leads. By proper interconnection of these leads, the output phases of a two channel static inverter may be converted to a three-phase Y or Δ connected source. Suitable control circuitry, constituting part of this invention, maintains the proper magnitudes and phase relationship between the inverter channel output signals.

My invention may be better understood and its numerous advantages will become apparent to those skilled in the art by reference to the accompanying drawing in which like reference numerals apply to like elements in the various figures and in which:

FIGURE 1 is a block diagram of the two channel static inverter which comprises this invention.

FIGURE 2 is a schematic of the prior art Scott-T transformer configuration.

FIGURE 3 is a vector diagram explaining the operation of a Scott-T two-phase to three-phase converter device.

FIGURE 4 is a schematic view of the novel Scott-T transformer configuration utilized as the output stage of the inverter of FIGURE 1.

FIGURE 5 shows how the Scott-T connection of FIGURE 4 is connected in Y.

FIGURE 6 shows how the Scott-T connection of FIGURE 4 is connected in Δ.

FIGURE 7 is a schematic showing how the voltage to be fed back to the inverter for regulation purposes is measured for the Scott-T configuration of FIGURE 4.

FIGURE 8 is a schematic of the equivalent circuit of the Y connected Scott-T configuration of FIGURE 5.

Referring now to FIGURE 1, there is shown a block diagram of a static inverter comprised of two identical inverter channels. The D.C. voltage which is to be changed into a three-phase A.C. voltage is furnished by a direct current source, which may be a battery, array of solar cells, fuel cell or any other like source of direct current. The negative terminal of the D.C. source is connected to an output stage in each of the inverter channels. The output stage typically is comprised of a pair of switch means which are connected to opposite ends of the primary winding of a center-tapped transformer. The positive terminal of the D.C. source is connected to the center tap of this transformer. The two switch means in the output stage are alternately closed thereby causing current to flow alternately in opposite directions through the transformer primary winding and back to the source. The closing of the switch means is controlled by an oscillator which supplies a sine wave at the desired frequency to a push-pull driver stage. The driver stage in turn generates square wave control pulses which are alternately applied to the switch means in the output stage. The current which flows in alternate directions in the primary winding of the transformer in the output stage generates a voltage which will be coupled to the secondary winding of this transformer and thence to a filter stage. Since the output of the driver which controls the closing of the switch means is a series of square pulses, the voltage which appears at the input to the filter stage will approximate a square wave. The filter stage attenuates the higher harmonics of this square wave signal thus producing a sine wave output. The sine wave output of the filter is fed to a two-phase to three-phase conversion device such as two output transformers which are connected in Scott-T configuration. The voltages which are supplied to the primary windings of the two transformers which comprise the Scott-T are maintained 90° out of phase by a phase control circuit. The control voltage for the phase control circuit is derived in a manner to be described below. To accomplish voltage regulation, the voltage derived from the output of the Scott-T is rectified and compared with a voltage reference. Error current due to the difference between the sensed and reference voltages is fed back to the driver stage and controls the pulse width of the switch control pulses produced by the driver by controlling the bias on elements in the driver which produce the control pulses. This may preferably be accomplished by controlling the point or magnitude of the sine wave input from the oscillator at which these elements will fire or begin to conduct.

Referring now to FIGURES 2 and 3, the output connections and corresponding phase diagram for a Scott-T transformer configuration of the type known in the prior art, which may be used in the two-phase to three-phase transformation device of FIGURE 1, is shown. As previously stated, the phase of one channel, at the primaries of the transformers which comprise the Scott-T, is at 90° to that of the other channel. Interconnection of the secondary winding ANO of teaser transformer T1 and BOC of main transformer T2 in the manner shown produces, as is apparent from the vector diagram of FIGURE 3, three-phase output. FIGURE 3 may also be used to explained operation of the phase control circuit. The voltages VAN and VBC are fixed and maintained constant by the voltage regulators in the two inverter channels. If phase unbalance occurs due to an unbalanced load, VAO will no longer be in quadrature with VBC and voltages VAB and VAC will thus no longer be equal in magnitude. Voltages VAB and VAC are detected, rectified and compared by the phase control circuit. If these voltages are not equal a D.C. error voltage will be generated. In this event, a phase sensitive modulator will convert the D.C. error voltage to a square wave which is then added to the sine wave output of the oscillator. The resultant complex wave, which is used to drive inverter channel 2, will be shifted in phase by an amount dependent upon by the amplitude of the error voltage and in the direction which will reduce the error voltage to zero. The relationship between the secondary voltages of the main and teaser transformers is thus maintained at 90°, and the three-phase output voltage relationship consequently will be 120°.

The modified Scott-T configuration which comprises part of my invention is shown in FIGURE 4. This Scott-T consists of teaser transformer T3 and main transformer T4. Only the secondary windings of these transformers and the sensing part of the control circuits require modification in order to obtain the additional capability of having three independent output phases that may be connected in either Y or Δ. All the advantages of the Scott-T are retained such as the requirement of only three control loops, two for voltage regulation and one for phase control, and equal division of power and volt amperes in the two channels for balanced loads. One modification occasioned by my invention consists of the addition of a third winding 5, 9 on the secondary of the teaser transformer T3. The secondary of the main transformer remains unchanged except that four terminals, rather than two end terminals and a center tap, are brought out. From an examination of FIGURE 4 it may be seen that, by permanently connecting winding 6, 7 of teaser transformer T3 in series with winding 3, 8 of main transformer T4 and similarly making a second series connection of the additional winding 5, 9 and the other secondary winding 2, 9 of the main transformer, a modified Scott-T configuration with six available output leads is formed. Since additional winding 5, 9 will have the same number of turns as winding 6, 7, a voltage equal to VNO of FIGURE 3 will be induced in both of these windings. Thus, it becomes apparent, when FIGURES 3 and 4 are considered together, that the six available output leads may be interconnected in such a manner so as to present either a Y or Δ connected source to the load. FIGURE 5 shows how the Y connection is made while FIGURE 6 depicts the Δ connection.

The phase and voltage magnitude control loops discussed above in relation to FIGURE 1 are unchanged when the modified Scott-T configuration of my invention is used. For voltage regulation of the teaser voltage V$aa'$, from channel 1 of FIGURE 1, $|V_{4,1}|$ of FIGURE 4 is sensed and compared with a reference potential in the voltage regulator. The error signal from the voltage regulator is then used to control, in the manner described above, the voltage generated in channel 1. In order to control the main transformer primary voltage V$b'b$, it is necessary to sense $$\frac{|V_{5,2} - V_{6,3}|}{\sqrt{3}}$$

and compare it with the reference. The error signal from the voltage regulator in channel 2, which makes this comparison, is used to control the magnitude of the voltage generated in channel 2. Since, in the delta connection, there is a potential difference between terminals 6 and 5, the voltage $|V_{5,2} - V_{6,3}|$ must be sensed in such a way as to keep the points 6 and 5 isolated. This may be done by using the scheme shown in FIGURE 7 wherein T5 is a small, lightweight, sensing transformer. The turns ratio of transformer T5 may be used to perform the division by $\sqrt{3}$. The control voltage for the phase control circuit is derived by comparing $|V_{6,3}|$ and $|V_{5,2}|$ and controlling the angle between the voltages generated in channels 1 and 2, in the manner described above, so as to minimize the difference between these voltages' magnitudes. The above described control procedure may be proven by designating $V_a = V_{1,4}$, $V_b = V_{5,2}$, and $V_c = {}_{6,3}$ It can be shown by straightforward algebra that if $$|V_a| = V_R$$

$$\frac{|V_b - V_c|}{\sqrt{3}} = V_R$$

and $$|V_b| = |V_c|$$

where $V_R$ = the reference voltage the phasors $V_a$, $V_b$, and $V_c$ are a balanced set equal in magnitude to $V_R$ and displaced by 120° provided $$V_a + V_b + V_c = 0$$

The control technique described previously realizes the three conditions set forth above. For the Δ connection, it is obvious that $V_a + V_b + V_c = 0$. This condition is also realized with the Y connection using a padding impedance, provided there is no neutral current. If the secondary impedances of the Scott-T transformer are small, the padding impedance may be omitted and neutral current may be drawn with only a negligible effect on the balance of the phasor output voltages in the Y connection. The padding impedance may be determined, by referring to FIGURE 8 wherein $E_1$ is the open circuit voltage VAO on the Scott-T, as follows:

$$V_a = \tfrac{2}{3} E_1 - I_a(\tfrac{2}{3} Z_1 + Z \text{ pad})$$

$$V_b = -\tfrac{1}{3} E_1 + \frac{E_2}{2} - I_b\left(\tfrac{1}{3} Z_1 + \frac{Z_2}{2}\right)$$

$$V_c = -\tfrac{1}{3} E_1 - \frac{E_2}{2} - I_c\left(\tfrac{1}{3} Z_1 + \frac{Z_2}{2}\right)$$

$$V_a+V_b+V_c=-I_a(\tfrac{2}{3}Z_1+Z\text{ pad})-(I_b+I_c)\left(\tfrac{1}{3}Z_1+\tfrac{Z_2}{2}\right)$$

when
$$V_a+V_b+V_c=0$$

if
$$I_a+I_b+I_c=0$$

$$(\tfrac{2}{3}Z_1+Z\text{ pad})=\left(\tfrac{Z_1}{3}+\tfrac{Z_2}{2}\right)$$

$$Z\text{ pad}=\frac{Z_2}{2}-\frac{Z_1}{3}$$

It should be noted that the turns ratio between the primary and secondary windings of the teaser and main transformers may not be chosen indiscriminately. These turns ratios must be such that the magnitudes of the voltages applied to the primaries of the main and teaser transformers may be controlled to give secondary voltages such that $$|E_1|=\frac{\sqrt{3}}{2}|E_2|$$

as shown in FIGURE 8.

The fundamental components of the voltages in the main and teaser windings are displaced by 90°. For symmetrical generation in the two channels, the third harmonic voltages in the main and teaser windings are displaced by 270° or −90°. Therefore, except for phase rotation, the phase displacement between the fundamental components in the main and teaser windings and the third harmonic components in the main and teaser windings are the same. Since the fundamental components of $V_a$, $V_b$, and $V_c$ form a balanced set equal in magnitude and displaced by 120°, the third harmonic components of $V_a$, $V_b$, and $V_c$ also form a balanced set equal in magnitude and displaced by 120°. This has the advantage of precluding circulating third harmonic currents for the connection using my invention.

While a preferred embodiment has been shown and described, various modifications and substitutions may be made without deviating from the scope and spirit of my invention. Thus my invention is described by way of illustration rather than limitation and accordingly it is understood that my invention is to be limited only by the appended claims taken in view of the prior art.

I claim:
1. A three-phase static inverter comprising:
   an oscillator circuit;
   first switch means coupled to and controlled by the output signal from said oscillator circuit for converting direct current to alternating current, said first switch means being adapted to be connected to a source of direct current;
   a phase control circuit also coupled to the output of said oscillator circuit for generating a signal having the same frequency but shifted in phase with relation to the oscillator output signal;
   second switch means connected to said phase control circuit and controlled by the signal generated thereby for converting direct current to alternating current, said second switch means being adapted to be connected to a source of direct current;
   a teaser transformer having a primary winding and first, second and third independent secondary windings, said first secondary winding having twice the number of turns as either of said second and third secondary windings;
   means applying the alternating current output signal generated by said first switch means across the primary winding of said teaser transformer;
   a main transformer having a primary winding and two independent secondary windings;
   means applying the alternating current output signal generated by said second switch means across the primary winding of said main transformer;
   means connecting a first secondary winding of said main transformer in series with the second secondary winding of said teaser transformer and connecting the second secondary winding of said main transformer in series with the third secondary winding of said teaser transformer to form two pairs of series connected windings whereby a Scott-T transformer configuration results;
   terminal means connected to the six secondary winding leads of said secondary windings of said main and teaser transformers not utilized to make said series connections whereby said windings may be connected in either Y or Δ;
   first comparator means connected across the first secondary winding of said teaser transformer and having a reference voltage source for generating a first error signal commensurate with the difference between the magnitude of the alternating voltage induced in said first teaser transformer secondary winding and said reference voltage;
   means applying said first error signal to said first switch means for controlling the magnitude of the alternating current output signal generated thereby;
   second comparator means coupled to said two pair of series connected windings and having a reference voltage source for sensing the magnitude of the vector difference between the voltages induced in each of said series connected pair of windings and for generating a second error signal commensurate with the difference between the magnitude of said vector difference and said reference voltage,
   means applying said second error signal to said second switch means to control the magnitude of the alternating current output signal generated thereby;
   third comparator means coupled to said two pair of series connected windings for comparing the magnitudes of the voltages induced in each of said series connected pair of windings and for generating a third error signal commensurate with the difference therebetween; and
   means for applying said third error signal to said phase control circuit for controlling the phase of the signal generated thereby and applied to said second switch means whereby said phase control circuit maintains the outputs of said first and second switch means in quadrature by minimizing said second error signal.

2. The apparatus of claim 1 wherein said six secondary winding leads are connected in Δ and wherein said second comparator means comprises:
   a sensing transformer having first and second primary windings and a secondary winding;
   means connecting the end terminals of a first pair of said series connected windings across a first one of said sensing transformer primary windings;
   means connecting the end terminals of the second pair of said series connected windings across the second one of said sensing transformer primary windings whereby said pairs of series connected windings will be electrically isolated and a voltage commensurate with the vector difference between the voltages induced in said pairs of series connected windings will be induced in said sensing transformer secondary winding; and
   voltage regulator means connected across the secondary winding of said sensing transformer and having a reference voltage source for comparing the magnitude of said vector difference voltage with said source voltage and for generating a second error signal commensurate with the difference therebetween.

3. The apparatus of claim 1 wherein said six secondary winding leads are connected in Y and wherein the inverter further comprises:

a padding impedance connected in series with said first secondary winding of said teaser transformer, said padding impedance having a value equal to the impedance of either of the secondary windings of said main transformer less the impedance of either of said second or third teaser transformer secondary windings, said first comparator means being connected across the series connection of said padding impedance and said teaser transformer first secondary winding.

References Cited by the Examiner

UNITED STATES PATENTS

| | | | |
|---|---|---|---|
| 764,213 | 7/1904 | Steinmetz | 321—57 |
| 2,001,465 | 5/1935 | Klinkhamer | 321—57 |
| 3,050,674 | 8/1962 | Moore | 321—27 |
| 3,168,692 | 2/1965 | Lilienstein | 321—52 |

JOHN F. COUCH, *Primary Examiner.*

LLOYD McCOLLUM, G. J. BUDOCK, G. GOLDBERG, *Assistant Examiners.*